3,562,315
HYDROUS REACTION OF ORGANIC HALIDES
AND CARBOXYLIC ACID AMIDES
Jane P. Cookson, Marshall Township, Allegheny County, and Joseph S. Matthews, O'Hara Township, Allegheny County, Pa., assignors to Gulf Research & Development Company, Pittsburgh, Pa., a corporation of Delaware
No Drawing. Filed May 25, 1967, Ser. No. 641,151
Int. Cl. C07c 67/02
U.S. Cl. 260—493
8 Claims

ABSTRACT OF THE DISCLOSURE

A method of making an alcohol and its carboxylic acid ester from the reaction of an organic halide, a carboxylic acid amide and water at an elevated temperature.

---

This invention relates to a novel process for producing alcohols and their esters from the hydrous reaction of organic halides and carboxylic acid amides.

Alkyl halides and aromatic halides react according to the following equations with two mols of a carboxylic acid amide under anhydrous conditions at about 150° to 200° C. to produce the N-substituted carboxylic acid amide and carbon monoxide as a by-product or the carboxylic acid ester and hydrogen cyanide and a black tarry material as by-products.

$$RCl + 2HCONH_2 \rightarrow HCONHR + CO + NH_4Cl \quad (1)$$
$$RCl + 2HCONH_2 \rightarrow HCOOR + HCN + NH_4Cl \quad (2)$$

The course of the reaction is strongly influenced by the structure of the halogen reactant.

We have discovered that in the presence of water one mol of an organic halide reacts completely with only one mol of a carboxylic acid amide and with the water to produce the corresponding organic alcohols and/or carboxylic acid esters in a relatively rapid, extremely clean reaction as compared with the anhydrous reaction. The organic halides are selected from the group consisting of primary straight and branched chain alkyl halides, secondary straight and branched chain alkyl halides, cyclic alkyl halides, and straight and branched chain olefinic halides.

Although the stoichiometry of our reaction requires only one mol of the carboxylic acid amide for each mol of organic halide, we prefer to use an excess of the amide as a solvent for the reactants. A reaction temperature of at least about 100° C. is desirable in order to insure a significant rate of reaction, although we prefer a minimum reaction temperature of at least 130° C. for improved reaction. In any event the minimum reaction temperature should be above the melting point of the amide. The maximum reaction temperature should be about 300° C. with a preferred maximum temperature of about 220° C. It is preferred in general not to exceed the boiling point of the amide. Since formamide begins to decompose at about 220° C., it is desirable not to significantly exceed this temperature when using formamide, and desirable to operate below this temperature.

As stated, one of the reactants required herein is a carboxylic acid amide. Since this constituent will also function as a solvent in the preferred form of the reaction when used in sufficient stoichiometric excess, an amide should be selected which not only is a liquid at reaction conditions but also is a solvent for both the organic halide and water. Among the carboxylic acid amides which are useful and which are preferred are formamide, acetamide and their mono- and di- N-substituted methyl and ethyl amides, such as monomethyl formamide, dimethylformamide, monomethyl acetamide and dimethyl acetamide. Also usable are the amides derived from carboxylic acids having up to five carbon atoms and their mono- and di- N-substituted methyl and ethyl derivatives such as propionamide, n-butyramide, valeramide, and N,N-dimethyl propionamide. Aromatic amides such as benzamide are also useful herein. The higher the molecular weight of the hydrocarbon moiety of the carboxylic acid amides the lower is their water solubility. From the standpoint of present availability and cost, formamide is preferred as the reactant amide as well as the solvent except when the ester is the desired end product, since the amide only contributes to the molecular structure of this product.

To react with the carboxylic acid amide defined above to produce the desired alcohol and/or ester in accordance with the process defined and claimed herein there must be a suitable organic halide of the group specified above. These include the primary straight and branched chain alkyl halides having from one to 30 carbon atoms, preferably from four to 20 carbon atoms, more preferably from eight to 16 carbon atoms, and the secondary straight and branched chain alkyl halides having from one to 30 carbon atoms, preferably from four to 20 carbon atoms, more preferably from eight to 16 carbon atoms. Examples of these compounds are chloromethane, bromomethane, iodomethane, 1-chlorobutane, 1-bromobutane, 1-iodobutane, 1-chloro-2-methyl propone, 1-chloro-4-bromobutane, 1,5-dichloro-3,3-dimethyl pentane, 1-chlorooctane, 2-chlorooctane, 3-chlorooctane, 4-chlorooctane, 1-bromooctane, 2-iodooctane, 1-chlorononane, 1-bromononane, 3-iodononane, 1-chlorodecane, 1-bromodecane, 1-chloroundecane, 1-chlorododecane, 1-bromododecane, 1-iodododecane, 4-chlorododecane, 1-bromotridecane, 1-chlorotetradecane, 1-bromotetradecane, 1-iodotetradecane, 5-bromotetradecane, 1-chloropentadecane, 1-chlorohexadecane, 1-bromohexadecane, 1 - iodohexadecane, 7 - bromohexadecane, 1-bromoheptadecane, 1-chlorooctadecane, 1-bromooctadecane, 1-iodooctadecane, 5-iodooctadecane, 1-iodononadecane, 1-chloroeicosane, 1-bromoeicosane, 1-iodoeicosane, 8-chloroeicosane, 1-bromopentacosane, 1-chlorotriacontane, 1-bromotriacontane, 1-iodotriacontane, 6-bromotricontane, etc.

Suitable organic halides of the group specified above also include primary cyclic halides having from four to 22 carbon atoms, preferably from four to 12 carbon atoms, and secondary cyclic halides having from three to 22 carbon atoms, preferably from three to 12 carbon atoms. Examples of these compounds include chlorocyclopropane, bromocyclopropane, chlorocyclopentane, chlorocyclopentylmethane, bromocyclopentane, bromocyclopentylmethane, iodocyclopentane, chlorocyclohexane, bromocyclohexane, chlorocyclohexylmethane, bromocyclohexylmethane, iodocyclohexane, 1 - iodo - 1 - cyclohexylmethane, 1-chlorocycloheptane, 1-bromocycloheptane, 1-iodocycloheptane, 1-chlorocyclooctane, 1-bromocyclooctane, 1-iodocyclooctane, 1-chlorocyclononane, 1 - bromocyclodecane, 1 - iodocycloundecane, 1-chlorocyclododecane, etc.

The suitable organic halides of the group specified above also include primary straight and branched chain olefinic halides having from three to 20 carbon atoms, preferably from six to 20 carbon atoms, and secondary straight and branched chain olefinic halides having from three to 20 carbon atoms, preferably from six to 20 carbon atoms except those in which the halogen is attached to a carbon atom forming the double bond. Examples of these compounds include allyl chloride, allyl bromide, allyl iodide, 4 - bromobutene - 1, 5 - chloropentene-1, 6-bromohexene-1, 7 - iodoheptene - 1, 1 - bromohexene-2, 1-chloroheptene - 3, 1 - bromoctene - 4, 3-chlorobutene-1, 4-bromopentene - 1, 5 - chlorohexene - 1, 1-chlorododecene-2, 1-bromohexadecene-2, 1 - iodoeicosene-2, 3 - iodooctene - 1, 3 - bromodecene - 1, 3 - iodododecene-1, 3-chlorohexadecene - 1, 3-bromoeicosene-1, 19-chloroeicosene-1, etc.

The organic halides defined above need not be employed as such, but one or more of the hydrogens thereon can be replaced by such diverse radicals as dialkylamino, alkoxy, alkylmercapto, alkyl, phenyl, benzyl, naphthyl, cycloalkyl, xylylenyl, etc. Examples of such organic halides are benzyl chloride, benzyl bromide, benzyl iodide, β - chloroethylbenzene, β - bromoethylbenzene, β - iodoethylbenzene, 1 - chloro - 3 - phenylpropane, 1-bromo-4-phenylbutane, 1 - iodo - 5 - phenylpentane, α-chloroxylene, α - bromoxylene, α - iodoxylene, 1 - chloro-6-methoxyhexane, 1-bromo - 8 - mercaptooctane, 1 - chloro-2-benzylpropane, 1 - bromo - 3 - phenylpropane, 1-bromo-4 - naphthylbutane, 1 - bromo - 3-cyclopropylpropane, 1-chloro - 5 - cyclohexylpentane, 1,4 - di-(omega-chloroethyl)benzene, etc.

Of these organic halides we prefer to employ the alkyl halides, particularly the primary alkyl halides. Of the alkyl halides we prefer the alkyl chlorides and the alkyl bromides.

Although the reaction mechanism is not understood with certainty, the stoichiometry of the reaction to the ester and to the alcohol is shown by the following equations in which formamide is used as the reactant-solvent:

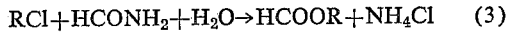
$$RCl + HCONH_2 + H_2O \rightarrow HCOOR + NH_4Cl \quad (3)$$

$$RCl + HCONH_2 + 2H_2O \rightarrow ROH + HCOOH + HN_4Cl \quad (4)$$

The overall stoichiometry of the reaction to the mixed ester-alcohol product is illustrated by the following equation:

$$RCl + HCONH_2 + (1+x)H_2O \rightarrow xROH + (1-x)HCOOR + xHCOOH + NH_4Cl \quad (5)$$

In this equation $x$ represents the proportion of the organic halide which is converted to the alcohol. The relative proportion of the alcohol and the ester that is produced is influenced by the organic halide and the amide that is used, by the amount of water that is used, and by the reaction conditions. When only the alcohol is desired, the ester can subsequently be converted to the alcohol by any conventional technique. A particularly useful process for accomplishing this is described in United States Patent Application filed by us of even date herewith in which the ester is reacted with ammonia in formamide as the solvent to produce the alcohol and regenerate the amide.

For the complete reaction of the organic halide a minimum of 1.5 mols of water per mol of organic halide is used with a preferred range of two to six mols of water per mol of organic halide. If less than 1.5 mols of water per mol of organic halide is utilized, the reaction is directed towards the production of the ester in a slower incomplete reaction. When the higher molar ratios of water are used, the overall yield of the alcohol is increased. However, the more water that is present the less soluble is the organic halide which necessitates a greater amount of amide solvent and results in an increase in the reaction time. The amount of water used must be in excess to a degree related to the water contained in the free space, i.e. gas volume, over the liquid reactant medium. These specified molar ratios do not take into consideration the amount of water present in this free space. In the preferred operation this free space is kept to a minimum.

The carboxylic acid amide in the preferred operation serves both as a reactant and as a solvent for the other reactants, i.e. the organic halide and the water. In order to perform this function we prefer to utilize at least three mols of water up to a maximum of about 50 mols of carboxylic acid amide per mol of water. Our most preferred molar proportion of carboxylic acid amide is from about five to about 20 mols of carboxylic acid amide per mol of water. Our broad range of molar proportions of carboxylic acid amide to organic halide is about five to 100 mols of carboxylic acid amide per mol of organic halide with a preferred range of about ten to 50 mols of carboxylic acid amide per mol of organic halide. The relative proportions of reactants utilized is significantly dependent upon the mutual solubilities of these components which are different for the different combinations of reactants.

The pressure under which the reaction is conducted is not critical. For convenience it is preferred to conduct the reaction near atmospheric pressure although an elevated pressure will increase the reaction rate due to the reduction in the volatility of the reactants, for example, water. We prefer to conduct the reaction at a pressure between ambient and 100 atmospheres.

Actual examples of the reaction described herein will now be set forth.

EXAMPLE 1

A mixture of 96.5 g. n-octyl bromide (0.5 mol), 450 g. formamide (10 mol) and 18 g. water (1 mol) were heated at 135° C. for four hours in a stirred reactor fitted with a reflux condenser and then cooled. The mixture separated into a clear upper layer and a clear bottom layer. The upper layer and the 60 to 96° C. cut from the bottom layer, obtained by vacuum distillation at 9 mm. Hg, contained the n-octyl formate and the n-octyl alcohol. These two fractions were mixed and distilled to produce 52 g. n-octyl formate (0.33 mol) and 17 g. n-octyl alcohol (0.13 mol). The 96 to 101° C. cut from both distillations contained 423 g. formamide (9.4 mol) and 7.4 g. water (0.4 mol). When 49 g. ammonium bromide (0.5 mol) precipitated during distillation, it was filtered out and distillation was continued on the filtrate. This example establishes that the one mol of the organic halide reacts with one mol of the carboxylic acid amide.

EXAMPLE 2

A mixture of 20 mols formamide, two mols water and one mol n-octyl bromide were heated with reflux at 146° C. The reaction was 98.4 percent complete after 1.5 hours and the mixture was clear with no black decomposition products. Approximately 0.7 mol n-octyl formate and 0.3 mol n-octyl alcohol were produced.

The reaction was repeated without water at 146° C. The reaction was 96.4 percent complete after 3.0 hours. The products consisted of 0.63 mol n-octyl formate, 0.09 mol n-octyl alcohol, 0.03 mol n-octyl formamide, and a significant quantity of black decomposition products. This reaction shows that the anhydrous reaction is slower than the hydrous reaction with the production of a lesser quantity of desired products and produced undesired black decomposition products.

EXAMPLE 3

A mixture of 8.5 g. n-tetradecylbromide, 44 g. dimethylformamide, and 1.8 g. water were heated with reflux at 140° C. for 2.5 hours in a stirred flask. The bromide was 100 percent converted into n-tetradecyldimethylformate and n-tetradecyl alcohol.

A mixture of 0.029 mol n-octyl bromide, which is more reactive than the n-tetradecylbromide, and 0.34 mol dimethylformamide were heated with reflux at 152° C. for three hours in a stirred flask. By analysis 98 percent of the n-octyl bromide was unconverted. This example demonstrates that the N-substituted carboxylic acid amides will function in the hydrous reaction but not in the anhydrous mixture.

Table 1 sets forth the results of a number of additional runs setting forth the effect of the different variables.

TABLE 1

| Run No. | Alkyl halide | Amide, mols | H₂O, mols | °C. | Time, hrs. | Percent halide converted |
|---|---|---|---|---|---|---|
| 1 | C₈Br | 47 | 5.3 | 135 | 2 | 100 |
| 2 | C₈Br | 9 | 6 | 130 | 3 | 75 |
| 3 | C₈Br | 22 | 6 | 140 | 3 | 100 |
| 4 | C₈Cl | 22 | 6 | 130–140 | 3 | 63 |
| 5 | C₈I | 22 | 6 | 130–140 | 3 | 100 |
| 6 | C₈Br | 22 | 6 | 130–140 | 3 | 97 |
| 7 | C₄Br | 13 | 3.5 | 100 | 3 | 40 |
| 8 | C₆Br | 20 | 2 | 140 | 1 | 100 |
| 9 | C₁₄Br | 20 | 3 | 170–174 | 3 | 98 |
| 10 | C₁₈Br | 20 | 3 | 170–190 | 24 | 100 |
| 11 | C₈Br | 21 | 2.2 | 130–135 | 2.5 | 97 |
| 12 | C₈Br | 21 | 2.2 | 130–135 | 2 | 99 |
| 13 | C₈Br | 21 | 2.2 | 130–135 | 2.5 | 91 |
| 14 | C₈Br | 21 | 2.2 | 150 | 1 | 99 |
| 15 | C₈Br | 43 | 6 | 140–150 | 1 | 100 |
| 16 | C₈Br | 10 | 3 | 140–150 | 2.25 | 91 |
| 17 | C₈Br | 15 | 3 | 140–150 | 1.75 | 99 |
| 18 | C₈Br | 43 | 6 | 140–150 | 1 | 100 |
| 19 | C₈Br | 4.5 | 1.5 | 145–150 | 6 | 90 |
| 20 | C₈Br | 4.5 | 1.5 | 145–150 | 22 | 100 |
| 21 | C₁₄Br | 20 | 2 | 145–150 | 2.5 | 25 |
| 22 | C₁₄Br | 20 | 2 | 145–150 | 21 | 100 |
| 23 | C₁₄Br | 20 | 3 | 145–150 | 2.5 | 96 |
| 24 | C₈Br | 20 | 2 | 100 | 3 | 12 |
| 25 | C₈Br | 20 | 2 | 100 | 30 | 84 |
| 26 | C₈Br | 20 | 2 | 100 | 50 | 98 |
| 27 | C₈Br | 20 | 2 | 100 | 53 | 100 |
| 28 | C₈Br | 20 | 2 | 167–174 | 0.5 | 97 |
| 29 | C₈Br | 20 | 2 | 167–174 | 0.75 | 100 |

In each run, except run No. 6, one mol of n-alkyl halide was reacted. In run No. 6 one mole of 2-bromooctane was used. The amides used were dimethyl formamide in runs 1, 21, 22, and 23; dimethyl acetamide in run 2; and formamide in the remainder of these runs. All runs were carried out using a stirred reactor fitted with a reflux condenser as in Example 1, except for runs 11 through 14, which used a stainless steel autoclave pressurized by nitrogen to pressures of 10, 3, 73 and 73 atmospheres, respectively. The products in each run were a mixture of the corresponding alcohols and esters with less than five percent of the mono- and di- N-substituted amides as a by-product.

In like manner the other organic halides are converted to the corresponding alcohols and esters. For example, 1-chlorocyclohexane reacts with water and formamide in like manner to produce a mixture of cyclohexanol and cyclohexylformate, allyl bromide produces a mixture of allyl alcohol and allyl formate, benzyl chloride produces a mixture of benzyl alcohol and benzyl formate, etc.

It is to be understood that the above disclosure is by way of specific example and that numerous modifications and variations are available to those of ordinary skill in the art without departing from the true spirit and scope of our invention.

We claim:

1. A process for preparing a mixture of an ester of a carboxylic acid and an alcohol which comprises reacting a carboxylic acid amide having the formula $RCONR_1R_2$ wherein R is hydrogen or an alkyl group having from one to four carbon atoms and $R_1$ and $R_2$ are independently selected from hydrogen, methyl and ethyl groups; water and an organic halide selected from primary alkyl halides having from one to 30 carbon atoms, secondary alkyl halides having from one to 30 carbon atoms, cycloalkyl halides having from three to 22 carbon atoms, and olefinic hydrocarbon halides having from three to 20 carbon atoms; said carboxylic acid amide, water and organic halide reacted in a one to one molar ratio of carboxylic acid amide to organic halide and said reacting conducted in the presence of a molar ratio of said carboxylic acid amide to water of at least about three to one up to about 50 to one and in the presence of a molar ratio of said carboxylic acid amide to said organic halide of from about five to one to about 100 to one at a temperature from about 100° C. to about 300° C.

2. A process in accordance with claim 1 in which the molar ratio of water to organic halide is at least about 1.5.

3. A process in accordance with claim 4 in which the molar ratio of water to organic halide is from about 2 to about 6, the molar ratio of carboxylic acid amide to organic halide is from about 10 to about 50, and the molar ratio of carboxylic acid amide to water is from about 5 to about 20.

4. A process in accordance with claim 1 in which the carboxylic acid amide is selected from formamide, acetamide, propionamide, n-butyramide and valeramide, and the temperature is from about 130° to 220° C.

5. A process in accordance with claim 7 in which the organic halide is selected from the class consisting of alkyl bromides and alkyl chlorides.

6. A process in accordance with claim 8 in which the alkyl halide is selected from the class consisting of octyl chlorides and octyl bromides and the carboxylic acid amide is formamide.

7. A process in accordance with claim 1 in which $R_1$ and $R_2$ are hydrogen.

8. A process in accordance with claim 1 in which $R_1$ and $R_2$ are methyl.

References Cited

UNITED STATES PATENTS 2,375,301  5/1945  Joyce _____ 260—493
3,157,705  11/1964  Pearce _____ 260—631

LORRAINE A. WEINBERGER, Primary Examiner

V. GARNER, Assistant Examiner

U.S. Cl. X.R.

260—476, 491, 609, 615, 617, 618, 631, 640

PO-1050
(5/69)

UNITED STATES PATENT OFFICE
CERTIFICATE OF CORRECTION

Patent No. 3,562,315         Dated February 9, 1971

Inventor(s) Jane P. Cookson and Joseph S. Matthews

It is certified that error appears in the above-identified patent and that said Letters Patent are hereby corrected as shown below:

Column 2, line 26, "propone" should read --propane--.
Column 3, line 30, "$HN_4Cl$" should read --$NH_4Cl$--.
Column 6, line 22, the claim reference numeral "4" should read --2--. Column 6, line 32, the claim reference numeral "7" should read --4--. Column 6, line 35, the claim reference numeral "8" should read --5--.

Signed and sealed this 15th day of June 1971.

(SEAL)
Attest:

EDWARD M. FLETCHER, JR.
Attesting Officer

WILLIAM E. SCHUYLER, JR
Commissioner of Patent